Oct. 8, 1929.  E. LIEBERT  1,731,169
METHOD OF CASTING ARTICLES OF PRECIOUS MATERIAL
Filed May 14, 1928
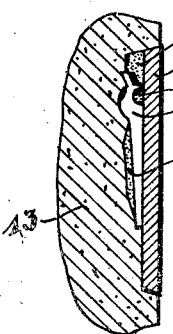
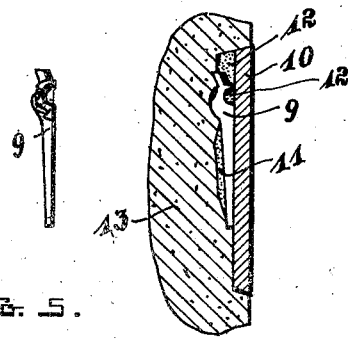
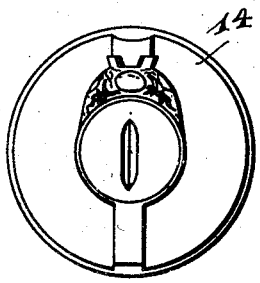
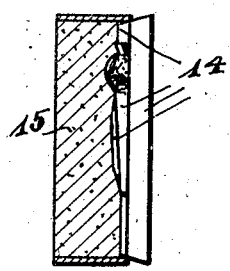
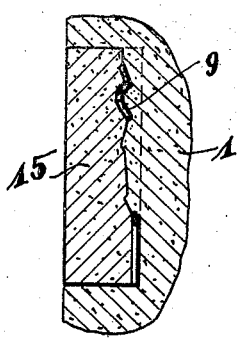
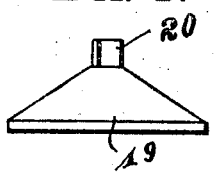
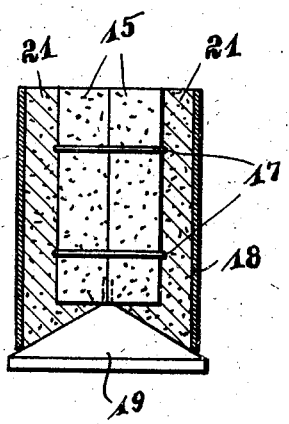
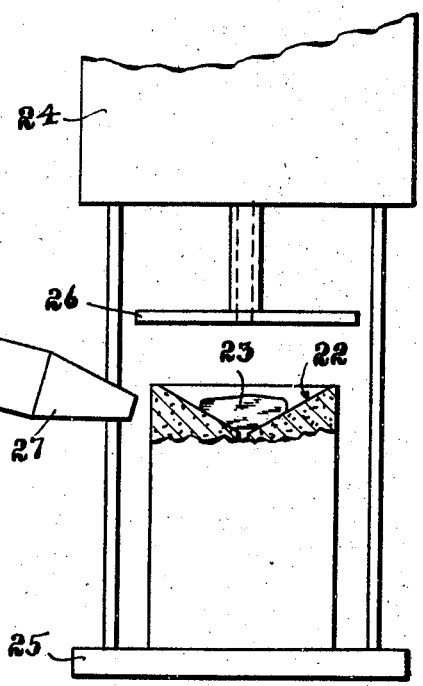
INVENTOR:
EMILE LIEBERT,
By: [signature]
his Atty.

Patented Oct. 8, 1929

1,731,169

UNITED STATES PATENT OFFICE

EMILE LIEBERT, OF LOS ANGELES, CALIFORNIA

METHOD OF CASTING ARTICLES OF PRECIOUS MATERIAL

Application filed May 14, 1928. Serial No. 277,754.

This invention relates to the producing and reproducing of jewelry, especially the mounting thereof.

One of the objects of this invention is to produce and reproduce rings.

Another object is the method of casting platinum rings.

Another object is to provide molds and apparatus by which platinum rings can be cast while under heat.

Another object is to provide molds and apparatus by which platinum rings can be cast while under heat and under pressure.

Other objects will appear from the following description and appended claims as well as from the accompanying drawing, in which—

Fig. 1 is a side elevation of half of a finger ring.

Fig. 2 is a cross section through a plate with the half of a finger ring attached thereto and plastic material filled into the hollow of the ring.

Fig. 3 illustrates a front elevation of a plate with the image of half of a finger ring and the hollow of the ring made of a solid piece of material according to this invention.

Fig. 4 is an edge view of the plate of Fig. 3 with a cross section through molding material, illustrating the manner in which a mold may be produced from the plate.

Fig. 5 is a cross section of a mold with half of a ring placed into the mold around which plastic material is shown in cross section to illustrate the manner in which a cast can be taken from the outer mold with a ring in it to produce the impression of the core which may be used to produce a core box.

Fig. 6 is a stand with a metal piece protruding from the stand.

Fig. 7 is a side elevation of the two halves of molds tight together in complete form inserted into a casing, illustrating material cast around the tight mold to reinforce the mold in the casing, the whole mold being supported on the stand illustrated in Fig. 6.

Fig. 8 is a fragmentary side elevation illustrating the mold-holding casing turned downside up, from which the stand has been removed whereby a recess is formed in the now upper end of this reinforced mold, metal in lump form being indicated in this recess to be melted, and the fragmentary outline of a pressure apparatus is indicated in proper relation to the mold with the end of a blow torch indicated pointing towards the side of the mold.

In the jewelry trade it has generally become an accepted belief that platinum can not be cast in the comparatively fine ornaments. Even fine ornaments made of other metal are preferably made under various procedures rather than by melting and casting.

Though hereafter a complete method from a certain primitive beginning to the end of the casting is described with reference to certain illustrations in the drawing, it must be understood that certain steps of the process may be left off and, though certain structures have been shown in the drawing, the illustrations are principally made to facilitate a description of the method of casting jewelry according to this invention.

Such a complete process of producing a ring from a very primitive stage to the casting of a desired ring may best be understood by following the different illustrations in the drawing.

Starting with the half of a ring, illustrated edgewise in Fig. 1 designated by numeral 9, the half is placed upon the side of a plate 10 and the hollow of the ring is then filled with a suitable plastic material preferably so that the plastic material protrudes beyond the ring, as indicated at 11 and 12. Wax has been found a suitable material for the purpose. Over this plate with the attached ring and wax core, plastic material is poured as indicated in dotted lines at 13, so that on a removal of the plate with the attached ring an impression is left in the plastic material.

Into this mold an alloy of suitable material is poured to produce the master plate 14 illustrated in Fig. 3.

Any establishment, factory, or shop with facilities to make, engrave, or stamp such a master plate may, of course, start with this instead of the steps described up to here.

A number of such master plates can, of course, easily be stamped or produced.

Over such a master plate 14 suitable plastic material is poured to form the mold proper indicated at 15 in Fig. 4. The mold, of course, can be cut and trimmed to any desired size and form on its outer contours to fit into any conventional holder or casing.

By placing into this mold 15 the ring-half 9, plastic material indicated at 16 poured over this mold with the inserted ring-half produces half of a core in the hollow of this plastic cast 16.

An alloy of suitable metals is then poured into this plastic form 16 to produce half of a core box of this metal alloy.

Producing two halves for a complete core box, the core box, of course, again can be trimmed to a suitable form on its outside so that it may be readily handled.

A number of such core boxes are preferably made.

Placing a desirable number of core boxes and a desirable number of master plates on a bench, plastic material is cast over the master plates as well as over the core boxes to produce the desired number of mold halves and cores.

The cores are then placed into the mold halves and the mold halves are, after they have been given a desired outside form, tied together as indicated at 17 and placed into a casing indicated at 18 in Fig. 7.

A base or stand 19 illustrated in Fig. 6 is also procured that has an extension 20 protruding from its top. The finished mold with the inserted core and also the casing 18 are placed on top of the stand 19 with the upwardly projecting end 20 extending into the mold. Plastic material indicated at 21 is then poured into the casing to fill up the space between the casing and the inserted mold whereby the plastic mold is firmly held in the casing 18. This whole combination forms then the complete mold for casting a ring.

The base 19 is then removed from this complete mold and the mold is placed downside up so that a recess 22 is left in the mold as illustrated in Fig. 8. Into this recess a lump of metal is placed as indicated at 23.

Though rings may be cast of gold and any other precious metal, this method is especially adapted for the casting of platinum rings since platinum cools rapidly and it is commonly accepted in the trade to be practically impossible to cast rings of platinum material for this reason, especially if the ring is to show fine ornaments.

Of course, it must be understood that besides rings other fine ornamental mountings can be cast according to this method or process.

To cast such ornaments in a mold of this type, the mold is placed in a conventional pressure apparatus roughly outlined at 24, the mold standing on the base 25 of the pressure apparatus and a movable, closing and operating plate 26 being in the position just above the mold. A blow torch of which the nozzle is roughly outlined at 27 is then applied to the side of the mold to heat the metal 23 in the recess 22 of the mold, or directly focused to the metal in the mold.

As soon as the metal placed in the recess 22 is found to be properly heated the pressure apparatus is operated in the conventional manner by bringing the closure plate 26 down upon the top edge of the mold at which time the pressure, customarily air pressure, in the conventional pressure apparatus is released into the mold whereby the melted metal 23 is forced into the finest cavities of the mold.

In this manner the finest ornaments can be cast of any material, especially of platinum of which a casting has been found difficult, or practically impossible.

Having thus described my invention, I claim:

1. The method of casting jewelry which consists in first producing half of a ring finished in all its fine ornaments, placing this half-ring on a base and filling its inside cavities with pliable material so as to form core and gate projections outwardly, applying molding material over the ring-half and filling in the base to form a temporary mold, pouring metal material into this mold to form a master plate, casting mold-halves over this master plate, placing the ring-half into a mold-half and producing a core, placing the core into the mold halves, depositing this combined mold and core structure into a casing-mold with a recess in its top end and then placing this under a pressure apparatus, then placing material of which a piece of jewelry is to be made in the said recess, then applying heat until the material placed in the recess is melted, and then closing the pressure apparatus upon the recess and operating the pressure apparatus to force the melted material into the mold and around the inserted core.

2. The method of casting jewelry which consists in first producing half of a ring finished in all its fine ornaments, placing the ring-half on a base and filling its inside cavities with a pliable material so as to form core and gate projections outwardly, applying molding material over the ring-half and filling on the base to form a temporary mold, producing a master plate with an image of the ring-half formed on the surface of the master plate, then applying plastic material over this master plate and finishing and trimming this plastic material into a complete mold with a recess in one of its sides with a conduit in communication with the inside of the mold, placing material of which a piece of jewelry is to be made in said recess, placing the mold with the material into a pressure apparatus, applying heat until the material in the recess is melted, and then closing the recess by the pressure apparatus and operating the pressure apparatus to force the melted material into the mold.

3. The method of casting jewelry of platinum which consists in first producing a piece of jewelry finished in all its fine ornaments, placing this piece on a base and filling its inside cavities with material to form core and gate projections outwardly, applying molding material over the piece and filling on the base to form a temporary mold, producing a master plate with an image of a portion of a desired piece of jewelry formed on the surface of the master plate, then applying plastic material over this master plate and finishing and trimming this plastic material into a complete mold with a recess in one of its sides with a conduit in communication with the inside of the mold, placing platinum of which a piece of jewelry is to be made in said recess, placing the mold with the platinum into a pressure apparatus, applying heat until the platinum in the recess is melted, and then closing the recess by the pressure apparatus and operating the pressure apparatus to force the melted platinum into the mold.

4. The method of casting an ornamental finger ring of platinum which consists in first producing a master plate with an image of half of a desired ring finished in all its fine ornaments formed on the surface of the master plate, then applying plastic material over this master plate and finishing and trimming this plastic material into a complete mold with a recess in one of its sides with a conduit in communication with the inside of the mold, producing a core and placing it in the mold, placing platinum of which a ring is to be made in said recess, placing the mold with the platinum into a pressure apparatus, applying heat until the platinum in the recess is melted, and then closing the recess by the pressure apparatus and operating the pressure aparatus to force the melted platinum into the mold.

In testimony that I claim the foregoing as my invention I have signed my name.

EMILE LIEBERT.